United States Patent Office

2,801,226
Patented July 30, 1957

2,801,226

RESINOUS COMPOSITIONS

Henry P. Wohnsiedler, Darien, Conn., assignor to American Cyanamid Company, New York, N. Y., a corporation of Maine No Drawing. Application December 4, 1953,
Serial No. 396,351

16 Claims. (Cl. 260—45.3)

This invention relates to heat-curable resinous compositions of the aminoplastic type. More particularly, this invention relates to heat-curable aminoplastic resins modified with polyhydroxyesteramides whereby resinous compositions having improved properties are obtained.

Various different materials have been proposed in the prior art as modifiers for amino resins for accomplishing certain purposes. These include, for example, polymethyl acrylate to improve flexibility, U. S. Patent No. 2,187,383; polyacrylonitrile to overcome crazing, U. S. Patent No. 2,463,032; glyceryl monoethers to improve flow, U. S. Patent No. 2,413,860; polyesters to improve mechanical properties, U. S. Patent No. 2,479,090; copolymers of acrylonitrile and isopropenyl toluene to improve toughness and impact strength, U. S. Patent No. 2,541,927.

Certain linear polyamides of the nylon type have also been incorporated into heat-curable aminoplastic resins to produce new compositions combining the good properties of thermosetting and thermoplastic resins. However, these modifiers are costly and, therefore, limit the possible applications of such modified resins.

I have now found that polyhydroxyesteramide condensation products of an alkyl diamine or an alkylol amine, a saturated dicarboxylic acid and a polyhydric alcohol may be incorporated into an aminoplastic resin whereby improved physical properties of the resinous material are realized. Not only does the modifier improve the plasticity of the composition, i. e., its flow during molding, but also the processing of the composition is improved. It has also been found that such properties including flexural modulus, impact strength and dimensional stability are improved. The amount of the modifier that is incorporated into the heat-curable resinous composition may vary over rather wide limits. Therefore, from about 45 to about 95 parts of the heat-curable resin may be employed to about 55 to about 5 parts of the thermoplastic polyhydroxyesteramide.

The thermoplastic polyhydroxyesteramide and the heat-curable aminoplastic resin, with or without fillers or other ingredients commonly employed in the preparation of molding compositions, are compounded or blended together, for instance by mixing in suitable equipment, e. g., a Banbury mixer, a ribbon-type blender, a ball-mill, etc., followed by milling or sheeting on differential rolls, one of which is generally hotter than the other, thereby obtaining a substantially homogeneous composition. During the compounding operation, e. g., while sheeting on differential rolls, the mixture is heated to a temperature which is at least sufficiently high to soften the thermoplastic product, e. g., at an average temperature of about 100–150° C. This heating facilitates the dispersion of the thermoplastic polyhydroxyesteramide and simultaneously therewith slightly advances the cure of the heat-curable aminoplastic resin. In no case are the temperature and time of compounding sufficient to convert the heat-curable resin to a substantially infusible state. However, as has been indicated, the temperature should be sufficiently high to soften the thermoplastic product and to disperse it in the resin. As milling proceeds, or preferably prior to milling, the clearance between the rolls may be adjusted if desired, thereby providing a further control of the temperature of the mix during milling. Blending procedures are described in detail in U. S. Patent No. 2,479,090. It is also possible to incorporate the modifier into the heat-curable resin in a liquid state. In this instance, the modifier is introduced into the heat-curable resin prior to the time that the resin syrup has been dried. After the thermoplastic polyhydroxyesteramide has been thoroughly and uniformly dissolved or dispersed in the resin syrup, the heat-curable resin may be dried as is conventional in the art, e. g., by vacuum-concentration, spray-drying, drum-drying, and the like.

The heat-curable aminoplastic resins, characterized by their outstanding resistance to heat, excellent electrical properties including resistance to arcing and by their low water-absorption values are, as is well known, synthetic resins derived from amino (including imino) or amido (including imido) compounds, a typical example being urea-formaldehyde resin (reference: Modern Plastics, 17, 2, 433 (1939)). The present invention is concerned particularly with the modification of aminoplastics which are products of reaction of ingredients comprising an aldehyde, e. g., formaldehyde, and a monomeric amidogen compound containing not less than two (e. g., two, three, four or any number, but preferably only two or three) amidogen groupings each having at least one hydrogen atom (preferably two hydrogen atoms) attached to the amidogen nitrogen atom. "Amidogen compound," as used herein and in the appended claims, has reference to an amino or an amido compound, and more particularly to such a compound (unless stated otherwise) which contains not less than two amidogen (amino or amido) groupings each having at least one hydrogen atom attached to the amidogen nitrogen atom. Urea and melamine are typical examples of amidogen compounds.

Any suitable aldehyde may be employed as a reactant with the amidogen compound in producing an aldehyde-reaction prooduct thereof. We prefer to use formaldehyde, e. g., aqueous solutions of formaldehyde. Paraformaldehyde, hexamethylenetetramine, or other compound engendering formaldehyde also may be employed. In certain cases other aldehydes, e. g., acetaldehyde, propionaldehyde, butyraldehyde, acrolein, methacrolein, crotonaldehyde, octaldehyde, benzaldehyde, furfural, mixtures thereof, or mixtures of formaldehyde (or compounds engendering formaldehyde) with such other aldehyde or aldehydes, may be employed. The choice of the aldehyde is dependent upon such factors as, for instance, the particular properties desired in the finished product and economic considerations.

The thermoplastic polyhydroxyesteramides employed as the modifiers for the heat-curable aminoplastic resins are the condensation products of a straight or branched chain polymethylene diamine containing from 2 to 6 carbon atoms or a straight or branched chain alkylol amine containing from 2 to 6 carbon atoms, a saturated dicarboxylic acid containing from 4 to 10 carbon atoms and a polyhydroxy alcohol containing from 3 to 6 carbon atoms. The diamines or the alkylol amines employed should contain the amino and/or the hydroxy group in the primary position. The polyhydroxy alcohol contains at least 3 hydroxy groups, 2 of which are in the primary position. In the preparation of the thermoplastic condensation product, various procedures may be utilized. Thus, the diamine or the alkylol amine may first be reacted with the dicarboxylic acid and the polyhydroxy alcohol then introduced into the reaction mixture for further condensation, or all of the ingredients may be simultaneously reacted to form the condensation product. Other procedures will be obvious to one skilled in the art. The thermoplastic polyhydroxyesteramide condensation products are characterized by the presence of free hydroxyl groups which aid the compatibility of the plasticizer with the heat-curable resin.

In the preparation of a resinous composition based on three or more reactants of the type contemplated, ordinarily a wide variation in the proportions of such reactants is possible. It has been found that certain proportions are essential to obtain nearly complete reaction of the reactants for low resin acid numbers and at the same time avoid gelation of the composition or loss of fusibility. It is also desirable to obtain inter-reaction of all the components in a homogeneous composition and to vary the reactant proportions in order to avoid excessively high melting points. Ordinarily, more than one mol of the dicarboxylic acid will be required per mol of diamine and at least one mol of polyhydric alcohol per mol of acid in excess of that which is required to react with the amine. The condensation products are characterized structurally as having recurring ester and amide linkages in a linear hydrocarbon chain and in having free or unesterified hydroxyl groups as substituents. A certain proportion of the polyhydric alcohol may remain uncombined in the composition. For purposes of identifying the preferred proportion of reactants, it may be assumed that the amine and dicarboxylic acid are fully combined yielding amide and ester linkages. The excess polyhydric alcohol will then be responsible for the presence of a certain amount of free hydroxyl. The composition may then be expressed in terms of the the ratio of ester to amide to hydroxyl groups. The ratio of ester to amide is at least 1 to 2 and preferably larger than 1, such as 3 to 1. The proportion of hydroxyl to ester is somewhat critical in that a low ratio may lead to gelation due to cross-linking of linear or branched chains through ester linkages. Generally, it will be necessary for this to be higher than 1, although this will vary somewhat as the ester to amide ratio is altered and in favor of a slightly lower value as the ester amide ratio approaches 1 to 2. The upper limit of hydroxyl to ester is determined by the amount of free polyhydric alcohol which can be tolerated. In an amino resin composition, free polyhydric alcohol is deleterious from the standpoint that it detracts from water resistance of the cured resin. Therefore, the ratio of hydroxyl to ester should not exceed 6 to 1 and preferably not 3 to 1. The free hydroxyl groups may be in the form of primary, secondary and tertiary hydroxyl attached directly to the carbon atoms in a chain, in the form of hydroxy methyl groups attached to these carbons, and as free polyhydric alcohol. The thermoplastic condensation products are further characterized by an acid number less than 10, preferably from about 1 to 5.

Illustrative examples of the compositions that may be employed to prepare the thermoplastic polyhydroxyesteramides are set forth below. Polymethylene diamines containing from 2 to 6 carbon atoms are such as ethylene diamine, trimethylene diamine, tetramethylene diamine, 1,4-diamino-2-methyl butane, pentamethylene diamine, hexamethylene diamine, and the like. Alkylol amines containing from 2 to 6 carbon atoms are such as ethanolamine, propanolamine, butanolamine, 1-amino-3-hydroxy-2-methyl propane, pentanolamine, hexanolamine, and the like. The saturated dicarboxylic acids finding employment in my invention contain from 4 to 10 carbon atoms and are such as succinic acid, glutaric acid, adipic acid, pimelic acid, suberic acid, azelaic acid, sebacic acid, and the like. The polyhydric alcohols containing from 3 to 6 carbon atoms and at least three hydroxyl groups, two of which are primary, are such as glycerol, butanetriol-1,2,4; butanetetrol-1,2,3,4; i-erythritol; pentaerythritol; trimethylol propane, 1,2,6-hexanetriol and the like. Alcohol ethers are often present in commercial sources of polyhydric alcohols. Thus, commercial glycerol may contain diglycerol and pentaerythritol may contain di- and tripentaerythritol. These polyhydric alcohol ethers fall within the scope of the present invention.

Illustrative examples of fillers that may be incorporated into the molding composition at any suitable stage of its manufacture are alpha-cellulose, wood flour, walnut shell flour, calcined or natural asbestos in the form of a powder or short or long fibers, finely divided silicon carbide, carbon black, graphite, diatomaceous earth, slate dust, powdered rutile, powdered or flake mica, powdered quartz, powdered glass, cloth cuttings (e. g., cuttings of silk, rayon, wool, linen, cotton, nylon, or of cloth made from glass fibers or from polymeric or copolymeric acrylonitrile fibers, etc.), ground cork, sand, etc. If desired, the filler and amino resin may first be compounded or blended together, after which the thermoplastic product is incorporated therewith under heat. The proportions of filler may be varied as desired or as conditions may require. Thus, depending, for instance, upon the particular filler employed and the intended use of the molded article, the filler may constitute, for example, from 5 to 80% by weight of the molding composition. It is apparent that no filler will be present in certain applications.

Dyes, pigments, curing agents (e. g., phthalic anhydride, phthalic acid, benzoyl peroxide, benzoic acid, tetrachlorphthalic anhydride, etc.), mold lubricants (e. g., zinc stearate, cadmium stearate, glycerylmonostearate, etc.) also may be introduced into the molding composition, e. g., by mixing with either of the primary components before they are admixed with each other or conjointly with the thermoplastic product and heat-curable amino resin such as melamine-formaldehyde resin when they are compounded or blended together.

In order that those skilled in the art better may understand how the present invention may be carried into effect, the following examples are given by way of illustration and not by way of limitation. All parts and percentages are by weight.

EXAMPLE 1

A condensation product of ethanolamine, adipic acid and glycerine was prepared as follows: 611 parts of ethanolamine (10 mols) and 1461 parts of adipic acid (10 mols) were heated under an inert atmosphere and at a temperature of 150° C. until 10 mols of water were discharged. 378 parts of this reaction mixture and 92 parts of glycerine were then heated together at a temperature of about 220–225° C. until an acid number of 2.6 was obtained. The ester amide hydroxyl ratio was 2:2:3.

The condensation product was a soft resin. It was blended on heated differential rolls with melamine-formaldehyde resin and cellulose filler to obtain a homogeneous composition. The melamine-formaldehyde resin used for this purpose had a molar ratio of melamine to formaldehyde of 1 to 2. The modifier in this case was 25% by weight of the combined resins and the proportion of resinous component to filler was 65 to 35.

EXAMPLE 2

1000 parts of the reaction mixture of ethanolamine and adipic acid prepared in Example 1 and 1595 parts of diglycerol adipate were heated at a temperature of about 220° C. to an acid number of about 10. The ester amide hydroxyl ratio was 3:1:4.

The condensation product was a balsamic resin. It was blended with heat-durable melamine-formaldehyde resin together with cellulose filler on heated differential rolls as in Example 1 to obtain a substantially homogeneous composition.

The modified resinous compositions produced in accordance with Examples 1 and 2 were then molded in order to determine the final properties of the cured resinous compositions. In each case, compression molding was carried out with a die producing a 4 x 1/8" test disc or other test piece at 155° C. and 3750 lbs./sq. in. (p. s. i.) pressure for intervals varying from 5 to 10 minutes.

Table I

|  | Unmodified Resin | Example 1 | Example 2 |
|---|---|---|---|
| Appearance | Translucent. | Translucent. | Sl. Translucent. |
| Flow Value | .043–.049 | 0.069 | 0.042. |
| Water Absorption: |  |  |  |
| 5' cure | 1.7 | 2.0 |  |
| 10' cure | .53 | 0.91 | 2.3. |
| Shrinkage (Mold/Aging): |  |  |  |
| 5' cure |  | 6.0/2.9 | 6.0/3.3. |
| 7½' cure | 5.8/3.5 |  |  |
| 10' cure | 5.5/4.2 | 4.9/3.5 | 5.0/3.5. |
| Flexural Strength, p. s. i. | 14,600 |  | 13,500. |
| Flexural Deflection, mils | 73 |  | 84. |
| Flexural Modulus (E) | 1.41×10⁶ |  | .83×10⁶. |
| Impact Strength (Ski-Ball) ft. lbs./in. | .23 |  | 0.21. |

Flow test described in U. S. 2,494,095; water absorption—weight increase in 30 minute water boil test;
Mold shrinkage—difference in dimension of cold mold and cold plastic in mils/inch;
Aging shrinkage—Additional shrinkage of plastic when aged at 220° F. for 48 hours in mils/inch;
Flexural strength and deflection on 1/4" x 1/2" x 5" test piece A. S. T. M. D–650;
Flexural modulus of elasticity $$(E) = \frac{PL^3}{4BD^3\Delta} \text{(lbs./sq. in.)}$$

where: $P$=load in lbs., $D$=depth of specimen in inches, $L$= span in inches, $B$=width in inches, $\Delta$=deflection in inches×10³, is determined on a 5 x 1/2 x 1/4" bar supported flatwise to have span of 4 inches in a testing machine, the head or point of application of force moving at a speed of 0.1 inch/minute.
Impact strength according to A. S. T. M. Bulletin No. 130 P 21–26 October 1944.

EXAMPLE 3

174.8 parts of ethylene diamine (2 mols), 808 parts of sebacic acid (4 mols) and 362 parts of water were heated under an inert atmosphere at temperatures increasing from 134 to 215° C. until the free water plus about 4 mols of condensation water were discharged.

This reaction mixture to the extent of 156 parts was then further condensed with 325 gs. dipentaerythritol sebacate prepared by alcohol ester interchange of two mols pentaerythritol and one mol of dibutyl sebacate to form the thermoplastic condensation product. Acid number of the product was 3.5. It was soluble in alcohol-water solvent. Its ester amide hydroxyl ratio was 3:1:5.

This plasticizer was then blended into a heat-curable unfilled melamine-formaldehyde resin on differential rolls in order to obtain a substantially homogeneous composition suitable for molding purposes.

For the preparation of laminates, 24 parts by weight of the polyhydroxyesteramide together with 24 parts of an intermediate type melamine-formaldehyde resin were dissolved in 72 parts of ethylene glycol monomethyl ether. This solution was used to saturate sheets of canvas and woven glass cloth. These sheets were then dried at 100° C. for 20 minutes. Sheets of one type were assembled in multiple between molding press platens, cured at 150° C. for 30 minutes at 2000 p. s. i. pressure, the platens cooled and assembly removed. Translucent laminates having excellent color and gloss with improved flexibility were obtained.

EXAMPLE 4

The reaction mixture of ethylene diamine and sebacic acid obtained in accordance with the procedure set forth in Example 3 was esterified with pentaerythritol to form a condensation product. The starting materials were equivalent to 1 mol of amine, 2 mols of acid and 2 mols of pentaerythritol. The ester amide hydroxyl ratio was 1:1:3. The product was a horny resin with acid number 3.4.

This plasticizer was also introduced into a heat-curable unfilled melamine-formaldehyde resinous composition to obtain a substantially homogeneous composition.

EXAMPLE 5

Ethylene diamine was reacted with pentaerythritol sebacate to form a condensation product having the same ester amide hydroxyl ratio as in Example 4.

This plasticizer was compounded with an unfilled urea-formaldehyde resinous composition on heated differential rolls to produce a substantially homogeneous composition.

EXAMPLE 6

The condensation product prepared in accordance with Example 3 was compounded on heated differential rolls with cellulose and an intermediate, fusible heat-reactive melamine-formaldehyde resin to produce a substantially homogeneous cellulose filled composition.

The molding compositions prepared in accordance with Examples 3, 4, 5, and 6 were heat-cured as described in Example 2 and the molded properties of the compositions determined. The results obtained are set forth in the following table.

Table II

UNFILLED MELAMINE-FORMALDEHYDE RESINS

| Example No. | Plasticizer, Percent | Flow | Water Absorption, 10' Cure | Shrinkage, 10' Cure | | Flexural | | | Impact Strength |
|---|---|---|---|---|---|---|---|---|---|
| | | | | Mold | Aging | Strength | Defl. | Young's Mod. | |
| 3 | 25 | .088 | .52 | 12.7 | 10.4 | 8,000–10,200 | 167–215 | .73 | .087 |
| 4 | 25 | .022 | .82 |  |  | 10,600–13,200 | 159–202 |  |  |
|  |  | .028 |  |  |  |  |  |  |  |
|  |  | .043 |  | 13.0 | 8.0 | 10,100–13,500 | 100–141 | .86 | .162 |
|  | Control | .022 |  |  |  |  |  |  |  |
|  | Control | .030 | .20 | 9.8 | 6.2 |  |  | 1.21 | .082 |

UNFILLED UREA-FORMALDEHYDE RESIN

| Example No. | Plasticizer, Percent | Flow | Water Absorption, 10' Cure | Shrinkage, 10' Cure | | Flexural | | | Impact Strength |
|---|---|---|---|---|---|---|---|---|---|
| | | | | Mold | Aging | Strength | Defl. | Young's Mod. | |
| 5 | 35 | .044 | 10.2 | 14.7 | 10.2 | 5,500 | 158 | .51 | .084 |

FILLED MELAMINE-FORMALDEHYDE RESIN

| Example No. | Plasticizer, Percent | Flow | Water Absorption, 10' Cure | Shrinkage, 10' Cure | | Flexural | | | Impact Strength |
|---|---|---|---|---|---|---|---|---|---|
| | | | | Mold | Aging | Strength | Defl. | Young's Mod. | |
| 6 | 25 | .048 |  | 7.3 | 5.2 | 13,100 | 149 | 1.15 | .34 |
|  | Control | .038 |  |  | 3.1–5.9 | 12,700–14,800 | 128–146 | 1.33–1.44 | .22–.24 |
|  | Control | .043 | 0.3–.5 | 4.8–6.1 |  |  |  |  |  |

EXAMPLE 7

Condensation products were prepared from each of three dicarboxylic acids including glutaric, pimelic and sebacic acids. In each case, two mols of the acid, one mol ethylene diamine and one mol pentaerythritol were reacted together at about 210° C. to near complete reaction. The glutaric acid resin was the most highly reacted and had the lowest acid number (27). This product assumed the form of a gel. All three compositions have as a basis a 1:1:1 ester amide hydroxyl ratio. This proportion of hydroxyl is below the minimum required for near complete reaction (acid number less than 10) and avoidance of gelation.

EXAMPLE 8

A group of condensation products was prepared having an ester amide hydroxyl ratio of 1:1:3. Two mols of pentaerythritol, two mols of acid and one mol of ethylene diamine were coreacted for this purpose at a maximum temperature of 250° C. The glutaric acid product was a soft plastic with acid number of 8.4 and solubility in water and 1:1 ethanol water solvent. The corresponding adipic and pimelic acid products with acid numbers of 2.5 and 8.9, respectively, also dissolved readily in alcohol-water solvent. All three members were compatible with aqueous or water-alcohol solutions of urea-formaldehyde, melamine-formaldehyde and benzoguanamine-formaldehyde resins. The sebacic acid analogue dissolved incompletely in alcohol-water but readily in t-butanol-water solvent and was compatible with melamine-formaldehyde resin in this solvent.

The adipic acid derived product was incorporated with a melamine-formaldehyde resin having a molar ratio of formaldehyde to melamine of 1:3. To an aqueous 50% solids solution of the melamine resin (3076 parts) at 60° C., 735 parts of a 70% aqueous solution of the polyhydroxyesteramide were added together with buffer. The pH of the mixture measured with a glass electrode type instrument was 8.0. The solution of the mixed resins was blended with 830 parts cellulose floc at 50° C. and the product tray-dried at 70° C. It was then ballmill ground with 0.5% glycerolmonostereate lubricant. Properties of the molded product having 25% modifier compared with unmodified product as follows:

|  | Unmodified Resin | Modified Resin |
| --- | --- | --- |
| Flow Value | .055 | .036 |
| Water Absorption (30 minute boil): | | |
| 5' cure 155° C | 0.39 | 1.5 |
| 7½' cure 155° C | .26 | .57 |
| Shrinkage (Mold/Aging): | | |
| 5' cure 155° C | 3.4/4.6 | 3.7/2.5 |
| 7½' cure 155° C | 3.3/5.0 | 3.4/2.1 |

For description of tests see Example 2.

EXAMPLE 9

Three mols of ethylene diamine, four mols adipic acid and two mols of pentaerythritol were coreacted to an acid number of 34. The product with a high amide to ester ratio of 3:1 and hydroxyl to ester ratio of 3:1 was hard and semi-crystalline in appearance. Its softening point was 216–243° C. and it dissolved incompletely in t-butanol-water solvent when heated.

The resinous compositions of this invention may be shaped or formed as by molding, extruding, calendering, etc., at temperatures ranging, for example, from about 130°–170° C. and at pressures varying from 1000 to 20,000 pounds or more per square inch. They may be molded by compression, injection, or transfer molding technique. The molding compositions of my invention show good flow characteristics during molding, and the molded articles produced are substantially homogeneous throughout and have a good surface appearance. Furthermore, they are tougher and show increased flexibility as compared with molded articles made from unplasticized aminoplast resins used in practicing my invention. Also, they show less shrinkage on aging and greater resistance to cracking around molded inserts.

My invention is operative with reaction products of an aldehyde, specifically formaldehyde, and any monomeric amidogen compound containing at least two aldehyde-reactable amino or amido groupings, that is to say, any monomeric amidogen compound containing at least two amidogen groupings each having at least one hydrogen atom (preferably two hydrogen atoms) attached to the amidogen nitrogen atom.

As amidogen-aldehyde aminoplastics, I prefer to use heat-curable or potentially heat-curable resinous reaction products of ingredients comprising a polyaminotriazine (e. g., melamine) and formaldehyde, or comprising urea, melamine (or other polyaminotriazine) and formaldehyde. However, heat-curable or potentially heat-curable urea-formaldehyde, thiourea-formaldehyde and thiourea-melamine-formaldehyde resinous reaction products also may be employed. Dimethylol urea, alkyl ethers thereof, polymethylol melamines (more particularly mono-, di-, tri-, tetra-, penta- and hexamethylol melamines) and alkyl ethers thereof may be used. Examples of other amidogen compounds which may be reacted with an aldehyde to provide the primary product which is modified in accordance with the present invention are: methylurea, phenylurea, phenylthiourea, allylurea, guanylurea, guanylthiourea, dicyandiamide, guanidine, biguanide, diaminodiazines, guanazole and other diaminotriazoles, ammeline, etc. Numerous examples of aldehydes that may be reacted with the amidogen compound have been mentioned hereinbefore. These amidogen-aldehyde aminoplastics are prepared, in general, in accordance with technique well known to the art. The molar ratio of aldehyde to amidogen compound, depending, for instance, upon the particular amidogen compound employed, may vary, for example, from 0.35 to 2.0 mols thereof for each aldehyde-reactable amidogen grouping in the amidogen compound, preferably 1 mol of aldehyde per each aldehyde-reactable amidogen grouping.

In view of the improved flow characteristics of the resinous compositions produced in accordance with my invention, they are especially adapted for use in the molding of intricate parts. They may also be used in forming a protective or decorative surface in the nature of a cured plastic film with or without filler upon plywood, Masonite, compressed wood, molded chipboard, laminated core stock such as urea-formaldehyde or phenol-formaldehyde stock or other plastic, fibrous and structural material or substrata.

In view of the favorable solubility features of the described modifiers, they are well adapted for use in water and water-alcohol solutions of aminoplastic resins for purposes of saturating, impregnating or coating fibrous materials in filament, mat or woven form including cellulose, regenerated cellulose, viscose rayon, cellulose acetate, wool, synthetic fibers such as nylon and polyacrylonitrile as well as fibrous glass. Thus, they may provide a protective, reinforcing or stiffening effect upon such materials or make possible a heat-sealing action or improve their dry and wet strength. Similarly, in the form of a finishing agent, the plasticized compositions may be used in the finishing of wool, rayon and cotton to improve water-resistance, shrinkage on laundering and crease-resistance as well as to facilitate embossing.

Laminates prepared by the methods described may be varied in properties depending on the proportion of resin and plasticizer. Properties such as flexibility, punch-ability and post-forming may be varied at will while improving dimensional stability and other mechanical properties.

The plasticizers of the present invention particularly adapted for use with unalkylated aminoplastic resins are not precluded from use with alkylated types such as dimethoxymethylurea, trimethoxymethyl melamine or condensation products in which only a proportion of the combined formaldehyde is in the form of alkoxymethyl radicals.

The plasticized compositions of the type described or the plasticizers themselves may be used with other natural or synthetic resins including phenol formaldehyde, polyepoxides, polyvinyl resins and vinyl copolymer resins, also polyacrylonitrile and acrylonitrile copolymer resins.

I claim:

1. A substantially homogeneous resinous composition of matter comprising (1) a heat-curable aminoplastic resin and (2) a thermoplastic polyhydroxyesteramide condensation product of (a) a compound selected from the group consisting of alkyl diamines containing from 2 to 6 carbon atoms and alkylol amines containing from 2 to 6 carbon atoms, (b) a saturated dicarboxylic acid containing from 3 to 10 carbon atoms and (c) a saturated polyhydroxy alcohol containing from 3 to 5 carbon atoms and at least 3 hydroxy groups wherein the proportions of (a), (b) and (c) yield a ratio of ester to amide linkages of at least 1:2 and a ratio of hydroxyl to ester higher than 1:1, and the ingredients of (1) and (2) being present in the said composition in the ratio of, by weight, from about 45 to about 95 parts of the former to from about 55 to about 5 parts of the latter.

2. A substantially homogeneous resinous composition of matter comprising (1) a heat-curable melamine-formaldehyde resin and (2) a thermoplastic polyhydroxyesteramide condensation product of (a) a compound selected from the group consisting of alkyl diamines containing from 2 to 6 carbon atoms and alkylol amines containing from 2 to 6 carbon atoms, (b) a saturated dicarboxylic acid containing from 3 to 10 carbon atoms and (c) a saturated polyhydroxy alcohol containing from 3 to 5 carbon atoms and at least 3 hydroxy groups wherein the proportions of (a), (b) and (c) yield a ratio of ester to amide linkages of at least 1:2 and a ratio of hydroxyl to ester higher than 1:1, and the ingredients of (1) and (2) being present in the said composition in the ratio of, by weight, from about 45 to about 95 parts of the former to from about 55 to about 5 parts of the latter.

3. A substantially homogeneous resinous composition of matter comprising (1) a heat-curable urea-formaldehyde resin and (2) a thermoplastic polyhydroxyesteramide condensation product of (a) a compound selected from the group consisting of alkyl diamines containing from 2 to 6 carbon atoms and alkylol amines containing from 2 to 6 carbon atoms, (b) a saturated dicarboxylic acid containing from 3 to 10 carbon atoms and (c) a saturated polyhydroxy alcohol containing from 3 to 5 carbon atoms and at least 3 hydroxy groups wherein the proportions of (a), (b) and (c) yield a ratio of ester to amide linkages of at least 1:2 and a ratio of hydroxyl to ester higher than 1:1, and the ingredients of (1) and (2) being present in the said composition in the ratio of, by weight, from about 45 to about 95 parts of the former to from about 55 to about 5 parts of the latter.

4. A substantially homogeneous resinous composition of matter comprising (1) a filler, (2) a heat-curable aminoplastic resin and (3) a thermoplastic polyhydroxyesteramide condensation product of (a) a compound selected from the group consisting of alkyl diamines containing from 2 to 6 carbon atoms and alkylol amines containing from 2 to 6 carbon atoms, (b) a saturated dicarboxylic acid containing from 3 to 10 carbon atoms and (c) a saturated polyhydroxy alcohol containing from 3 to 5 carbon atoms and at least 3 hydroxy groups wherein the proportions of (a), (b) and (c) yield a ratio of ester to amide linkages of at least 1:2 and a ratio of hydroxyl to ester higher than 1:1, and the ingredients of (2) and (3) being present in the said composition in the ratio of, by weight, from about 45 to about 95 parts of the former and to from about 55 to about 5 parts of the latter.

5. A substantially homogeneous resinous composition of matter comprising (1) a filler, (2) a heat-curable melamine-formaldehyde resin and (3) a thermoplastic polyhydroxyesteramide condensation product of (a) a compound selected from the group consisting of alkyl diamines containing from 2 to 6 carbon atoms and alkylol amines containing from 2 to 6 carbon atoms, (b) a saturated dicarboxylic acid containing from 3 to 10 carbon atoms and (c) a saturated polyhydroxy alcohol containing from 3 to 5 carbon atoms and at least 3 hydroxy groups wherein the proportions of (a), (b) and (c) yield a ratio of ester to amide linkages of at least 1:2 and a ratio of hydroxyl to ester higher than 1:1, and the ingredients of (2) and (3) being present in the said composition in the ratio of, by weight, from about 45 to about 95 parts of the former to from about 55 to about 5 parts of the latter.

6. A substantially homogeneous resinous composition of matter compriisng (1) a filler, (2) a heat-curable urea-formaldehyde resin and (3) a thermoplastic polyhydroxyesteramide condensation product of (a) a compound selected from the group consisting of alkyl diamines containing from 2 to 6 carbon atoms and alkylol amines containing from 2 to 6 carbon atoms, (b) a saturated dicarboxylic acid containing from 3 to 10 carbon atoms and (c) a saturated polyhydroxy alcohol containing from 3 to 5 carbon atoms and at least 3 hydroxy groups wherein the proportions of (a), (b) and (c) yield a ratio of ester to amide linkages of at least 1:2 and a ratio of hydroxyl to ester higher than 1:1, and the ingredients of (2) and (3) being present in the said composition in the ratio of, by weight, from about 45 to about 95 parts of the former to from about 55 to about 5 parts of the latter.

7. A substantially homogeneous resinous composition which comprises (1) a heat-curable aminoplastic resin and (2) a thermoplastic polyhydroxyesteramide condensation product of (a) ethylene diamine, (b) sebacic acid and (c) pentaerythritol wherein the proportions of (a), (b) and (c) yield a ratio of ester to amide linkages of at least 1:2 and a ratio of hydroxyl to ester higher than 1:1, and the ingredients of (1) and (2) being present in the said composition in the ratio of, by weight, from about 45 to about 95 parts of the former to from about 55 to about 5 parts of the latter.

8. A substantially homogeneous resinous composition which comprises (1) a filler, (2) a heat-curable aminoplastic resin and (3) a thermoplastic ployhydroxyesteramide condensation product of (a) ethylene diamine, (b) sebacic acid and (c) pentaerythritol wherein the proportions of (a), (b) and (c) yield a ratio of ester to amide linkages of at least 1:2 and a ratio of hydroxyl to ester higher than 1:1, and the ingredients of (2) and (3) being present in the said composition in the ratio of, by weight, from about 45 to about 95 parts of the former to from about 55 to about 5 parts of the latter.

9. A substantially homogeneous resinous composition which comprises (1) a heat-curable melamine-formaldehyde resin and (2) a thermoplastic polyhydroxyesteramide condensation product of (a) ethylene diamine, (b) sabacic acid and (c) pentaerythritol wherein the porportions of (a), (b) and (c) yield a ratio of ester to amide linkages of at least 1:2 and a ratio of hydroxyl to ester higher than 1:1, and the ingredients of (1) and (2) being present in the said composition in the ratio of, by weight, from about 45 to about 95 parts of the former to from about 55 to about 5 parts of the latter.

10. A substantially homogeneous resinous composition which comprises (1) a heat-curable urea-formaldehyde resin and (2) a thermoplastic polyhydroxyesteramide condensation product of (a) ethylene diamine, (b) sebacic acid and (c) pentaerythritol wherein the proportions of (a), (b) and (c) yield a ratio of ester to amide linkages of at least 1:2 and a ratio of hydroxyl to ester higher than 1:1, and the ingredients of (1) and (2) being present in the said composition in the ratio of, by weight, from about 45 to about 95 parts of the former to from about 55 to about 5 parts of the latter.

11. A substantially homogeneous resinous composition which comprises (1) a filler, (2) a heat-curable melamine-formaldehyde resin and (3) a thermoplastic polyhydroxyesteramide condensation product of (a) ethylene diamine, (b) sebacic acid and (c) pentaerythritol wherein the proportions of (a), (b) and (c) yield a ratio of ester to amide linkage of at least 1:2 and a ratio of hydroxyl to ester higher than 1:1, and the ingredients of (2) and (3) being present in the said composition in the ratio of, by weight, from about 45 to about 95 parts of the former to from about 55 to about 5 parts of the latter.

12. A substantially homogeneous resinous composition which comprises (1) a filler, (2) a heat-curable urea-formaldehyde resin and (3) a thermoplastic polyhydroxyesteramide condensation product of (a) ethylene diamine, (b) sebacic acid and (c) pentaerythritol wherein the proportions of (a), (b) and (c) yield a ratio of ester to amide linkages of at least 1:2 and a ratio of hydroxyl to ester higher than 1:1, and the ingredients of (2) and (3) being present in the said composition in the ratio of, by weight, from about 45 to about 95 parts of the former to from about 55 to about 5 parts of the latter.

13. A substantially homogeneous resinous composition which comprises (1) a heat-curable aminoplastic resin and (2) a thermoplastic polyhydroxyesteramide condensation product of (a) ethanolamine, (b) adipic acid and (c) glycerol wherein the proportions of (a), (b) and (c) yield a ratio of ester to amide linkages of at least 1:2 and a ratio of hydroxyl to ester higher than 1:1, and the ingredients of (1) and (2) being present in the said composition in the ratio of, by weight, from about 45 to about 95 parts of the former to from about 55 to about 5 parts of the latter.

14. A substantially homogeneous resinous composition which comprises (1) a filler, (2) a heat-curable aminoplastic resin and (3) a thermoplastic polyhydroxyesteramide condensation product of (a) ethanolamine, (b) adipic acid and (c) glycerol wherein the proportions of (a), (b) and (c) yield a ratio of ester to amide linkages of at least 1:2 and a ratio of hydroxyl to ester higher than 1:1, and the ingredients of (2) and (3) being present in the said composition in the ratio of, by weight, from about 45 to about 95 parts of the former to from about 55 to about 5 parts of the latter.

15. A substantially homogeneous resinous composition which comprises (1) a heat-curable aminoplastic resin and (2) a thermoplastic polyhydroxyesteramide condensation product of (a) ethylene diamine, (b) pimelic acid, and (c) pentaerythritol wherein the proportions of (a), (b) and (c) yield a ratio of ester to amide linkages of at least 1:2 and a ratio of hydroxyl to ester higher than 1:1; and the ingredients of (1) and (2) being present in the said composition in the ratio of, by weight, from about 45 to about 95 parts of the former to from about 55 to about 5 parts of the latter.

16. A substantially homogeneous resinous composition which comprises (1) a filler, (2) a heat-curable aminoplastic resin and (3) a thermoplastic polyhydroxyesteramide condensation product of (a) ethylene diamine, (b) pimelic acid, and (c) pentaerythritol wherein the proportions of (a), (b) and (c) yield a ratio of ester to amide linkages of at least 1:2 and a ratio of hydroxyl to ester higher than 1:1, and the ingredients of (2) and (3) being present in the said composition in the ratio of, by weight, from about 45 to about 95 parts of the former to from about 55 to about 5 parts of the latter.

References Cited in the file of this patent

UNITED STATES PATENTS

| | | |
|---|---|---|
| 2,490,003 | Jayne et al. | Nov. 29, 1949 |
| 2,490,005 | Jayne et al. | Nov. 29, 1949 |